United States Patent [19]
Lee et al.

[11] Patent Number: 5,949,671
[45] Date of Patent: Sep. 7, 1999

[54] POWER SUPPLY WITH RE-CONFIGURABLE OUTPUTS FOR DIFFERENT OUTPUT VOLTAGES AND METHOD OF OPERATION THEREOF

[75] Inventors: Victor K. Lee; Rui Liu, both of Plano, Tex.

[73] Assignee: Lucent Technologies Inc., Murray Hill, N.J.

[21] Appl. No.: 09/048,246

[22] Filed: Mar. 25, 1998

Related U.S. Application Data

[60] Provisional application No. 60/052,564, Jul. 15, 1997.

[51] Int. Cl.$^6$ ...................................................... H02M 1/10
[52] U.S. Cl. ................................ 363/142; 363/67; 363/89
[58] Field of Search ................................... 363/67, 68, 69, 363/89, 142, 143

[56] References Cited

U.S. PATENT DOCUMENTS

| | | | |
|---|---|---|---|
| 4,712,171 | 12/1987 | Yamashita | 363/142 |
| 4,888,545 | 12/1989 | Celenza et al. | 323/258 |
| 5,119,284 | 6/1992 | Fisher et al. | 363/48 |
| 5,386,359 | 1/1995 | Nochi | 363/21 |

FOREIGN PATENT DOCUMENTS

| | | |
|---|---|---|
| 0 165 087 A1 | 4/1985 | European Pat. Off. . |
| 08223909 | 8/1996 | Japan . |

Primary Examiner—Shawn Riley

[57] ABSTRACT

For use with a DC power supply having first and second output rectifying circuits couplable in alternative configurations to provide dual voltages at an output of the DC power supply, an adaptive voltage controller and a method of adaptively controlling the output voltage. In one embodiment, the adaptive voltage controller includes: (1) a configuration determination circuit, coupled to the output, that generates a configuration signal that is a function of a configuration of the first and second output rectifying circuits, (2) a voltage feedback circuit, coupled to the configuration determination circuit, that develops a voltage feedback signal based on the configuration signal and (3) a voltage control circuit, coupled to the voltage feedback circuit, that receives the voltage feedback signal and controls an output voltage of the DC power supply as a function thereof.

20 Claims, 2 Drawing Sheets

POWER SUPPLY WITH RE-CONFIGURABLE OUTPUTS FOR DIFFERENT OUTPUT VOLTAGES AND METHOD OF OPERATION THEREOF

CROSS-REFERENCE TO RELATED APPLICATION

This Application claims the benefit of U.S. Provisional application Ser. No. 60/052,564, filed on Jul. 15, 1997, and entitled "Power Supply with Re-configurable Outputs for Different Output Voltages and Method of Operation Thereof," commonly assigned with the present invention and incorporated herein by reference.

TECHNICAL FIELD OF THE INVENTION

The present invention is directed, in general, to power conversion and, more specifically, to a DC power supply that may be configured to provide alternative output voltages and a method of operating a DC power supply to provide alternative output voltages.

BACKGROUND OF THE INVENTION

The traditional reliability of telecommunications systems that users have come to rely upon is due largely to the systems' operation on highly reliable and redundant power systems. Power systems used in telecommunications applications typically consist of a DC power supply that converts commercial alternating current (AC) power into direct current (DC) power for use by the telecommunications system. To be suitable for use in many different countries, the DC power supply must be compatible with a wide range of voltages and frequencies. Commercial power in Europe, for example, is supplied at 220 VAC, 50 Hz. In the United States, however, a standard voltage is 120 VAC at 60 Hz. In addition, brownouts may significantly reduce line voltages and, conversely, lighter loads, particularly at night, may cause the line voltages to increase. Accordingly, power supplies are typically designed to operate with frequencies between 47 and 65 Hz, and with voltages ranging from 85 VAC to as high as 265 VAC (commonly known as "universal input").

The DC power supply converts this AC voltage to a DC voltage required by telecommunications equipment contained in a particular telecommunications system. The DC power supply generally includes an electromagnetic interference (EMI) filter, a power factor correction circuit and a DC/DC converter. The EMI filter is employed to ensure compliance with EMI standards. The power factor correction circuit converts commercial AC power to a DC voltage, for instance, 400 VDC. The DC/DC converter then scales the high DC voltage down to a lower voltage as required by a board-mounted power supply (BMP) within the telecommunications equipment.

Telecommunications equipment typically operate on one of two voltages: +24 VDC or -48 VDC. Wireless equipment, for instance, often require +24 VDC. Central office equipment, however, typically require -48 VDC. Telecommunications power supplies are, therefore, designed for either +24 VDC or -48 VDC operation.

To maintain high availability of the telecommunications system, the power supplies are used in the power systems in a redundant configuration. Seamless operations of the telecommunications system is assured, even if one DC power supply fails. The failed DC power supply must immediately be replaced, however, to maintain redundancy and avoid future loss of service. Service providers, therefore, must have an inventory of power supplies available for immediate placement in the system. Because of the different voltage requirements of the telecommunications equipment, service providers are currently forced to maintain in reserve both types of power supplies. It would be advantageous, for multiple reasons, to inventory only one type of DC power supply.

Accordingly, what is needed in the art is a DC power supply capable of providing multiple output voltages (e.g., +24 VDC or -48 VDC), as required by the system it powers.

SUMMARY OF THE INVENTION

One way to provide reconfigurable outputs is to have multiple output rectifying circuits. The output rectifying circuits can be configured serially or in parallel to provide the necessary output voltage.

The multiple output rectifying circuits can derive power from a single, common transformer and deliver power to a common load. The output current of each output rectifying circuit, however, may vary due to component tolerances. Though the output power from each rectifying circuit is the same, the output voltages and currents may still vary. Protective functions such as over-voltage and under-voltage shutdown and output current limit must, therefore, be scaled according to the current drawn from each output. If current-sharing can be guaranteed, current sensing may be performed at one output. Under these circumstances, the protective functions need not be individually calibrated for each rectifying circuit.

One way to facilitate current sharing is to match the components of the output rectifying circuits to ensure that current is evenly shared. Unfortunately, component-matching increases the overall time and expense required to manufacture the DC power supply. An alternative way to guarantee current-sharing is to provide separate, series-coupled transformers for each of the output rectifying circuits. By series-coupling the primary windings of the separate transformers, the same current is forced to flow through each transformer and therefore through each corresponding output rectifying circuit.

Once current-sharing is guaranteed (by either of the above-described techniques) the current in one of the output rectifying circuits can be directly controlled, and the other output rectifying circuits are controlled indirectly.

Having ensured that current is shared and correctly controlled, it next becomes necessary to control the output voltage. However, since the DC power supply is capable of selectively providing multiple output voltages, a voltage control technique that adapts to multiple output voltages must be developed.

To address the need for an adaptive voltage control technique, the present invention provides, for use with a DC power supply having first and second output rectifying circuits couplable in alternative configurations to provide dual voltages at an output of the DC power supply, an adaptive voltage controller and a method of adaptively controlling the output voltage. In one embodiment, the adaptive voltage controller includes: (1) a configuration determination circuit, coupled to the output, that generates a configuration signal that is a function of a configuration of the first and second output rectifying circuits, (2) a voltage feedback circuit, coupled to the configuration determination circuit, that develops a voltage feedback signal based on the configuration signal and (3) a voltage control circuit, coupled to the voltage feedback circuit, that receives the voltage feedback signal and controls an output voltage of the DC power supply as a function thereof.

The present invention therefore introduces the broad concept of adapting the voltage feedback signal in a voltage controller to accommodate different output voltages. This allows a single voltage controller to regulate a reconfigurable DC power supply at its output voltages. While a dual-voltage DC power supply will hereinafter be illustrated and described, the scope of the present invention is not so limited. The present invention generally provides an adaptive voltage control technique that is capable of accommodating two or more alternative voltages at an output of a power supply employing the same.

The foregoing has outlined, rather broadly, features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
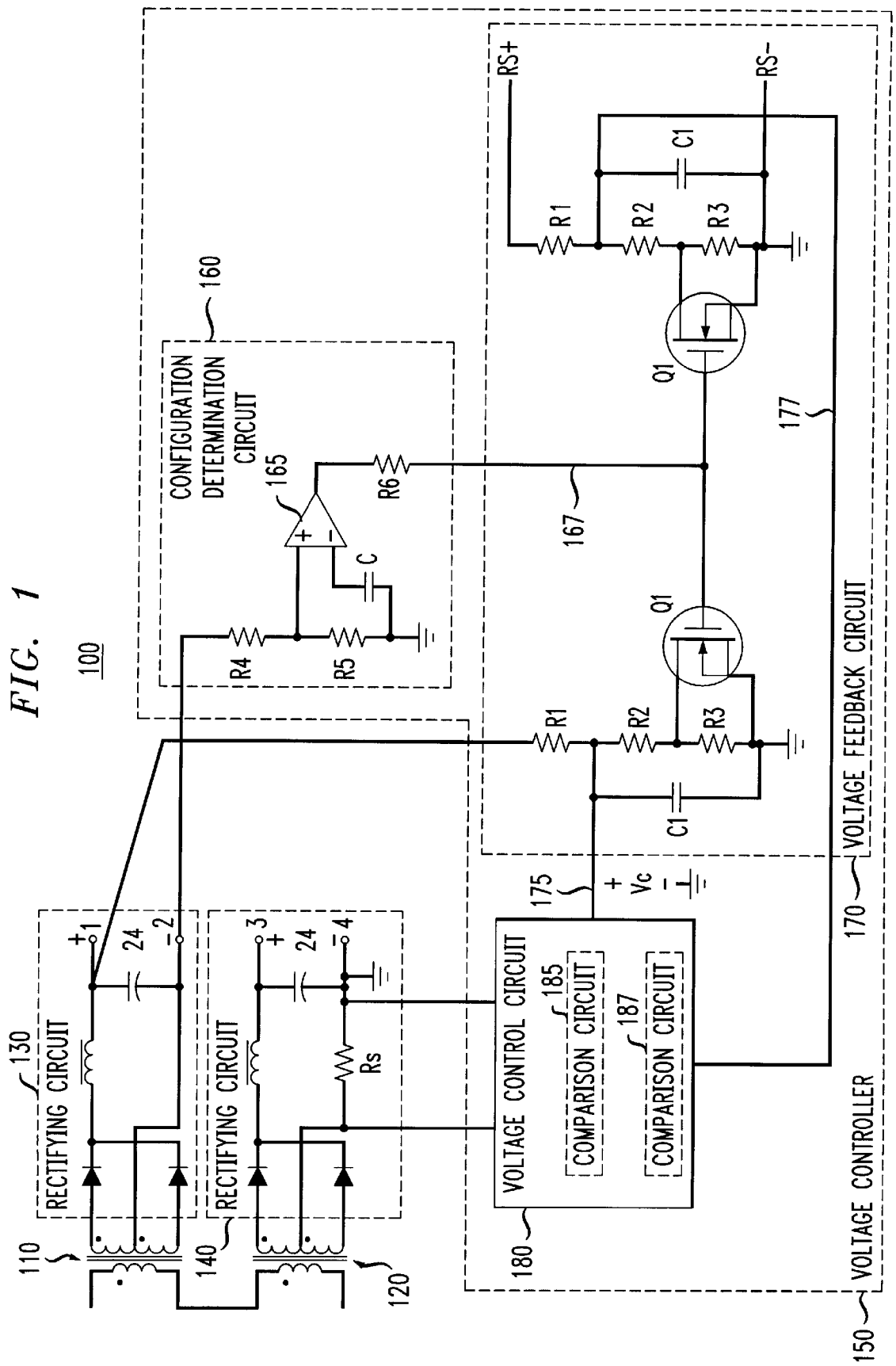
FIG. 1 illustrates one embodiment of a DC power supply constructed according to the principles of the present invention.

Referring initially to FIG. 1, illustrated is one embodiment of a DC power supply 100 constructed according to the principles of the present invention. The DC power supply 100 includes a first and second isolation transformer 110, 120 (each having a primary and a secondary winding) coupled to a first and second output rectifying circuit 130, 140, respectively. In the illustrated embodiment, the first and second transformers 110, 120 have the same turns ratio. The first and second transformers 110, 120 are series-coupled, thereby evenly dividing an output current of the DC power supply 100 between the first and second output rectifying circuits 130, 140. Those skilled in the art should understand, however, that a single transformer may also be used. The DC power supply 100 further includes an adaptive voltage controller 150 for controlling an output of the DC power supply 100.

In one embodiment of the present invention, the first and second output rectifying circuits 130, 140 each include a rectifier diode and a filter capacitor. In a preferred embodiment, the first and second output rectifying circuits 130, 140 each include a pair of rectifier diodes, an output inductor, and a filter capacitor. The first and second output rectifying circuits 130, 140 are couplable in alternative parallel and series configurations to provide dual voltages at the output of the DC power supply 100. In the illustrated embodiment, the dual voltages are +24 VDC and −48 VDC.

Of course, the DC power supply 100 may be configured to supply other voltages and more than two voltages. The first and second output rectifying circuits 130, 140 are couplable as follows. In the parallel configuration, a first and second terminal 1, 2 are coupled to a third and fourth terminal 3, 4 respectively. In the series configuration, the second and third terminals 2, 3 are coupled together and the output voltage is provided across the first and fourth terminals 1, 4.

The voltage controller 150 includes a configuration determination circuit 160, coupled to the output of the DC power supply 100, that generates a configuration signal 167 that is a function of a configuration of the first and second output rectifying circuits 130, 140. In this embodiment of the present invention, the configuration determination circuit 160 consists of a comparator 165 and its associated components (i.e., resistors R4, R5, reference voltage source Vref). The voltage controller 150 further includes a voltage feedback circuit 170, coupled to the configuration determination circuit 160, that develops output voltage feedback signals 175, 177 based on the configuration signal 167. The voltage feedback circuit 170 consists, in this embodiment, of two circuits, each having a resistor ladder formed from a first, second, and third resistor R1, R2, R3, coupled to a resistor bypass switch Q1. Those skilled in the art should realize that the voltage feedback circuit 170 may, in alternative embodiments, consist of one or more circuits, developing one or more voltage feedback signals. The voltage feedback signals 175, 177 of the two circuits represent, respectively, the output voltage sensed at the output of the DC power supply 100 and at a load (not shown). The voltage feedback signals 175, 177 may operate alternatively as required by the DC power supply 100. The voltage controller 150 still further includes a voltage control circuit 180, coupled to the voltage feedback circuit 170. The voltage control circuit 180 consists of, in this embodiment, a set of comparison circuits 185, 187 that receives the voltage feedback signals 175, 177. Of course, the use of any number of comparison circuits is within the broad scope of the present invention. The voltage control circuit 180 uses the voltage feedback signals 175, 177 to control the output voltage of the DC power supply 100 as a function thereof. Those skilled in the art are familiar with closed loop feedback circuits, and, as a result, an operation of the voltage control circuit 180 will not be described in detail. Additionally, the voltage control circuit 180 may use the voltage feedback signals 175, 177 to initiate under-voltage and overvoltage shutdown.

The present invention therefore introduces the broad concept of adapting the voltage feedback signals 175, 177 in the voltage controller 150 to accommodate different output voltages. This allows the single voltage controller 150 to control a dual-voltage DC power supply at either of its output voltages. While the power supply 100 is a dual-voltage power supply, the scope of the present invention is not so limited.

The operation of conventional DC power supplies should already be familiar to those skilled in the art, and, as a result, the operation thereof will not be described in detail. The voltage controller 150 operates as follows. The configuration determination circuit 160 senses the output voltage of an output terminal of one of the output rectifying circuits 130, 140. In the illustrated embodiment, the configuration determination circuit 160 senses the output voltage of the second terminal 2. The output voltage of the second terminal 2 is either +24 VDC or ground, indicating the configuration of the first and second output rectifying circuits 130, 140. If, for instance, the first and second output rectifying circuits 130, 140 are configured in series to provide −48 VDC, the second and third terminals 2,3 will be coupled together. The output voltage of the second terminal 2 will, therefore, be +24 VDC. If, however, the first and second output rectifying circuits 130, 140 are configure in parallel to provide +24 VDC, the output voltage of the second terminal 2 will be ground (0 VDC). The comparator 165 of the configuration determination circuit 160 thus generates the configuration signal 167 from the output voltage of the second terminal 2.

In the illustrated embodiment of the present invention, the configuration signal 167 assumes a discrete value (e.g., a logic zero or logic one) as a function of the configuration. Alternatively, the configuration signal 167 may be continuously variable or of another function. The present invention is not limited to a particular form of configuration signal 167.

The configuration signal 167 is used by the voltage feedback circuit 170 to generate the voltage feedback signals 175, 177. In the illustrated embodiment, the resistance of the resistor ladder is a function of the configuration signal 167. The configuration signal 167 either enables or disables a resistor bypass switch Q1, altering the overall resistance of the resistor ladder, and thereby producing the voltage feedback signals 175, 177.

The comparison circuits 185, 187 of the voltage control circuit 180 then compare the voltage feedback signals 175, 177 to reference voltages to control the output voltage. Additionally, the comparison circuits 185, 187 may initiate under-voltage and over-voltage shutdown of the power supply 100. Those skilled in the art are familiar with conventional control techniques based on feedback and development of error signals.

Figure 2:
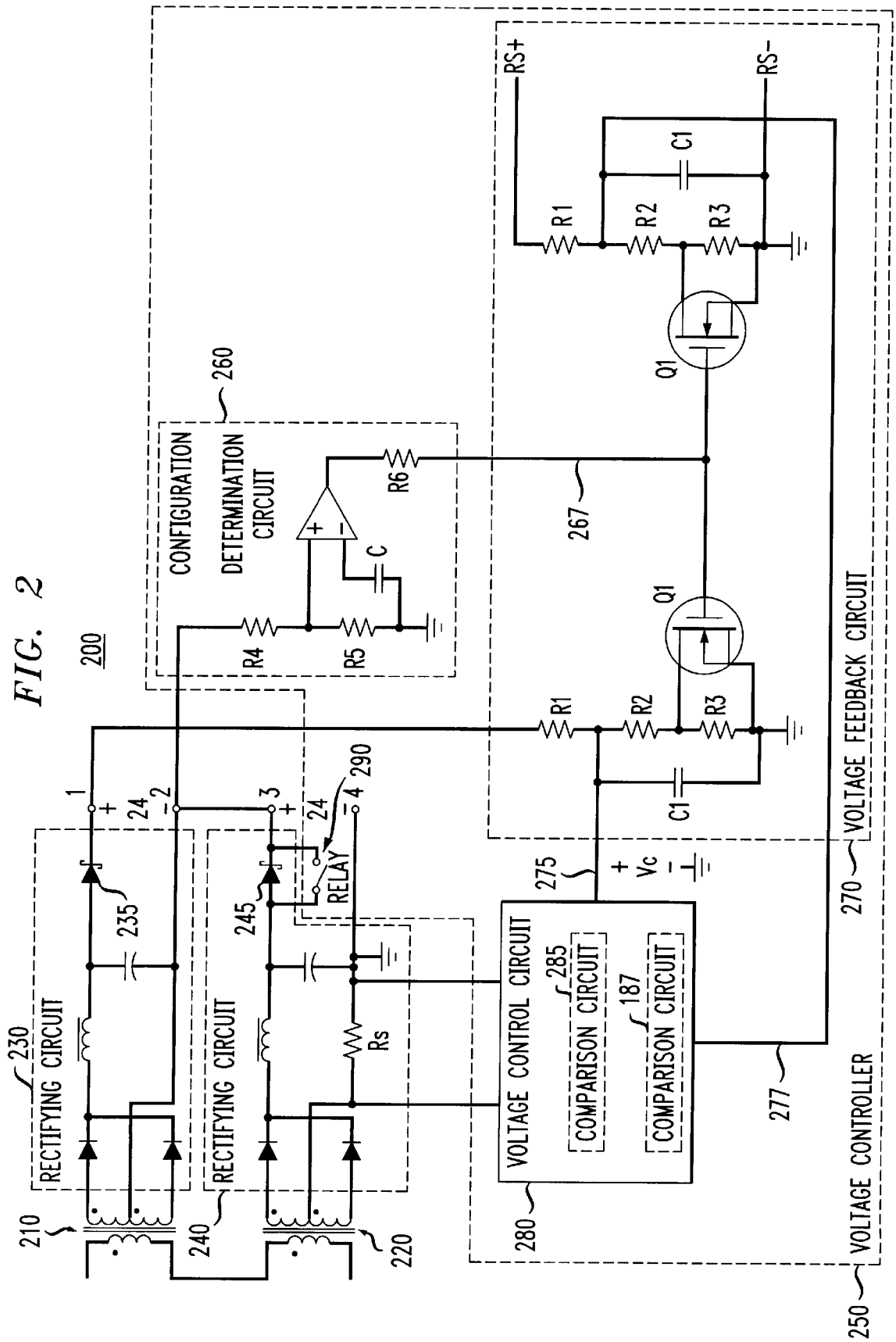
FIG. 2 illustrates another embodiment of a DC power supply constructed according to the principles of the present invention.

Turning now to FIG. 2, illustrated is another embodiment of a DC power supply 200 constructed according to the principles of the present invention. The DC power supply 200 includes a first and second isolation transformer 210, 220 coupled to a first and second output rectifying circuit 230, 240, respectively. In the illustrated embodiment, a first output of the first rectifying circuit 230 is provided across first and second terminals 1, 2. A second output of the second rectifying circuit 240 is provided across third and fourth terminals 3, 4. The DC power supply 200 further includes an adaptive voltage controller 250 for controlling an output of the DC power supply 200.

The first and second output rectifying circuits 230, 240, each include a first and second rectifier diode, an output inductor, and a filter capacitor. Alternatively, the first and second output rectifying circuits 230, 240 may each include a rectifier diode and a filter capacitor. Those skilled in the art should realize that the output inductor and second rectifier diode are not an integral part of the first and second output rectifying circuits 230, 240. The first output rectifying circuit 230 further includes a first output diode 235. The second output rectifying circuit 240 further includes a second output diode 245. The first and second output rectifying circuits 230, 240 are, of course, couplable in alternative parallel and series configurations.

The voltage controller 250 includes a configuration determination circuit 260, coupled to the output of the DC power supply 200, that generates a configuration signal 267 that is a function of a configuration of the first and second output rectifying circuits 230, 240. The voltage controller 250 further includes a voltage feedback circuit 270, coupled to the configuration determination circuit 260, that develops voltage feedback signals 275, 277 based on the configuration signal.

The voltage controller 250 further includes a voltage control circuit 280, coupled to the voltage feedback circuit 270. The voltage control circuit 280 consists of, in this embodiment, a set of comparison circuits 285, 287 that receives the voltage feedback signals 275, 277 and controls the output voltage of the DC power supply 200 as a function thereof. In the illustrated embodiment, the voltage control circuit 280 is a conventional closed loop feedback circuit, familiar to those skilled in the art. The comparison circuits 285, 287 compare the voltage feedback signals 275, 277 to a reference voltage and produce therefrom pulse width modulated drive signals to control switches in a power stage of the DC power supply 200.

The voltage controller 250 still further includes a diode bypass circuit 290, coupled to the second output diode 245, that receives the configuration signal from the configuration determination circuit 260 and bypasses the output diode as a function thereof. In the illustrated embodiment, the diode bypass circuit 290 consists of a relay. Of course, any type of bypass circuit may be used.

The operation of the DC power supply 200 is substantially similar to the operation of the DC power supply 100 of FIG. 1 and will not be described in detail. In the illustrated embodiment, the second and third terminals 2, 3, are coupled together, configuring the first and second output rectifying circuits 230, 240 in series to provide −48 VDC. The configuration determination circuit 260, coupled to the second terminal 2, thus senses +24 VDC. Alternatively, the first and second output rectifying circuits 230, 240 may be configured in parallel to provide +24 VDC. The configuration determination circuit 260 would then sense 0 VDC (ground).

The first and second output diodes 235, 245 protect the first and second output rectifying circuits 230, 240, respectively, when the first and second output rectifying circuits 230, 240 are coupled in a parallel configuration. The second output diode 245 is not required, however, when the first and second output rectifying circuits 230, 240 are series-configured. The diode bypass circuit 290, therefore, bypasses the second output diode 245 as a function of the configuration signal. By bypassing the second output diode 245, any inefficiency associated therewith is eliminated. Of course, the number of diode bypass circuits may vary depending on the number of output rectifying circuits.

In the illustrated embodiment, the first and second output rectifying circuits 230, 240 are in series. The +24 VDC sensed by the configuration determination circuit 260 may thus be used to drive the diode bypass circuit 290 to bypass the second output diode 245. Alternatively, if the first and second output rectifying circuits 230, 240 are in parallel, the 0 VDC (ground) sensed by the configuration determination circuit 260 may be used to turn off the diode bypass circuit 290, thereby leaving the second output diode 245 in the circuit.

Although the present invention has been described in detail, those skilled in the art should understand that they can make various changes, substitutions and alterations herein without departing from the spirit and scope of the invention in its broadest form.

What is claimed is:

1. For use with a DC power supply having first and second output rectifying circuits couplable in alternative configurations to provide dual voltages at an output of said DC power supply, an adaptive voltage controller, comprising:

a configuration determination circuit, coupled to said output, that generates a configuration signal that is a function of a configuration of said first and second output rectifying circuits;

a voltage feedback circuit, coupled to said configuration determination circuit, that develops a voltage feedback signal based on said configuration signal; and a voltage control circuit, coupled to said voltage feedback circuit, that receives said voltage feedback signal and controls an output voltage of said DC power supply as a function thereof.

2. The controller as recited in claim 1 wherein said first and second output rectifying circuits are couplable in alternative parallel and series configurations to provide said dual voltages.

3. The controller as recited in claim 1 wherein said configuration determination circuit senses an output voltage of an output terminal of one of said first and second output rectifying circuits.

4. The controller as recited in claim 1 wherein said configuration signal assumes a discrete value as a function of said configuration.

5. The controller as recited in claim 1 wherein said voltage feedback circuit includes a resistor ladder having a resistance that is a function of said configuration signal.

6. The controller as recited in claim 1 wherein said voltage control circuit comprises a comparison circuit that compares said voltage feedback signal to said output voltage to control said output voltage.

7. The controller as recited in claim 1 wherein one of said first and second output rectifying circuits includes an output diode, said controller further comprising a diode bypass circuit, coupled to said output diode, that receives said configuration signal from said configuration determination circuit and bypasses said output diode as a function thereof.

8. A method of controlling a DC power supply having first and second output rectifying circuits couplable in alternative configurations to provide dual voltages at an output of said DC power supply, comprising the steps of:

generating a configuration signal that is a function of a configuration of said first and second output rectifying circuits;

developing a voltage feedback signal based on said configuration signal; and controlling an output voltage of said DC power supply as a function thereof.

9. The method as recited in claim 8 wherein said first and second output rectifying circuits are couplable in alternative parallel and series configurations to provide said dual voltages.

10. The method as recited in claim 8 wherein said step of generating comprises the step of sensing an output voltage of an output terminal of one of said first and second output rectifying circuits.

11. The method as recited in claim 8 wherein said configuration signal assumes a discrete value as a function of said configuration.

12. The method as recited in claim 8 wherein said step of developing comprises the step of modifying a resistance of a resistor ladder.

13. The method as recited in claim 8 wherein said step of controlling comprises the step of comparing said voltage feedback signal to said output voltage to control said output voltage.

14. The method as recited in claim 8 wherein one of said first and second output rectifying circuits includes an output diode, said method further comprising the step of bypassing said output diode as a function of said configuration signal.

15. A DC power supply, comprising:

first and second output rectifying circuits, outputs of said first and second output rectifying circuits being alternatively couplable in a parallel configuration to provide power at a lower voltage and couplable in a series configuration to provide power at a higher voltage; and a voltage controller for controlling said DC power supply at a selected one of said lower and higher voltages, including:

a configuration determination circuit, coupled to said output, that senses an output voltage of an output terminal of one of said first and second output rectifying circuits and generates a configuration signal that is a function of a configuration of said first and second output rectifying circuits, a voltage feedback circuit, coupled to said configuration determination circuit, that develops a voltage feedback signal based on said configuration signal, and a voltage control circuit, coupled to said voltage feedback circuit, that receives said voltage feedback signal and controls said output voltage as a function thereof.

16. The power supply as recited in claim 15 further comprising separate first and second transformers coupled to said first and second output rectifying circuits, respectively, said first and second transformers evenly dividing an output current of said DC power supply between said first and second output rectifying circuits.

17. The power supply as recited in claim 15 wherein said configuration signal assumes a discrete value as a function of said configuration.

18. The power supply as recited in claim 15 wherein said voltage feedback circuit includes a resistor ladder having a resistance that is a function of said configuration signal.

19. The power supply as recited in claim 15 wherein said voltage control circuit comprises a comparison circuit that compares said voltage feedback signal to said output voltage to control said output voltage.

20. The power supply as recited in claim 15 wherein one of said first and second output rectifying circuits includes an output diode, said controller further comprising a diode bypass circuit, coupled to said output diode, that receives said configuration signal from said configuration determination circuit and bypasses said output diode as a function thereof.

* * * * *